(12) United States Patent
Kliskey

(10) Patent No.: US 9,434,220 B2
(45) Date of Patent: Sep. 6, 2016

(54) TIRE DEMOUNTING TOOL FOR DEEP-DISH WHEEL RIMS

(71) Applicant: Summit Tool Company, Akron, OH (US)

(72) Inventor: Roger Kliskey, Akron, OH (US)

(73) Assignee: SUMMIT TOOL COMPANY, Akron, OH (US)

( * ) Notice: Subject to any disclaimer, the term of this patent is extended or adjusted under 35 U.S.C. 154(b) by 330 days.

(21) Appl. No.: 14/326,735

(22) Filed: Jul. 9, 2014

(65) Prior Publication Data

US 2016/0009149 A1   Jan. 14, 2016

(51) Int. Cl.
*B60C 25/02* (2006.01)

(52) U.S. Cl.
CPC ..................... *B60C 25/02* (2013.01)

(58) Field of Classification Search
CPC ............... B60C 25/00; B60C 25/02
See application file for complete search history.

(56) References Cited

U.S. PATENT DOCUMENTS

| | | | | |
|---|---|---|---|---|
| 1,619,426 A | * | 3/1927 | Lew ................. | B60C 25/02 157/1.33 |
| 5,806,578 A | * | 9/1998 | Gonzaga ........... | B60C 25/02 157/1.3 |
| 6,588,479 B1 | | 7/2003 | Kliskey | |
| 6,712,114 B2 | | 3/2004 | Kliskey | |
| 6,913,061 B2 | | 7/2005 | Kliskey | |
| 7,156,141 B1 | | 1/2007 | Kliskey | |
| 7,163,041 B1 | * | 1/2007 | Tran ................. | B60C 25/02 157/1.1 |
| 7,261,136 B1 | * | 8/2007 | Kliskey ............ | B60C 25/04 157/1.17 |
| 7,267,155 B2 | * | 9/2007 | Brahler, II ....... | B60C 25/02 157/1.17 |
| 2011/0315326 A1 | * | 12/2011 | Jouve ............... | B60C 25/02 157/1.3 |

* cited by examiner

*Primary Examiner* — David B Thomas
(74) *Attorney, Agent, or Firm* — Renner Kenner Greive Bobak Taylor & Weber

(57) ABSTRACT

A tire demounting tool for demounting a second bead of a tire from a deep-dish wheel rim having a flange includes a handle that extends along a longitudinal axis. Extending from the handle is an extension section that extends radially away from the longitudinal axis at an oblique angle. Attached to the extension section is a curved pivot from which a wedge extends therefrom. The wedge is inserted between the second bead of the tire and the flange of the wheel rim, such that the pivot rests upon a sidewall of the tire, while the handle of the demounting tool extends back across the wheel rim. Thus, one individual is able to anchor the tire while applying a force to the handle of the demounting tool to lift the wedge to demount the second bead of the tire from the deep-dish wheel rim.

11 Claims, 9 Drawing Sheets

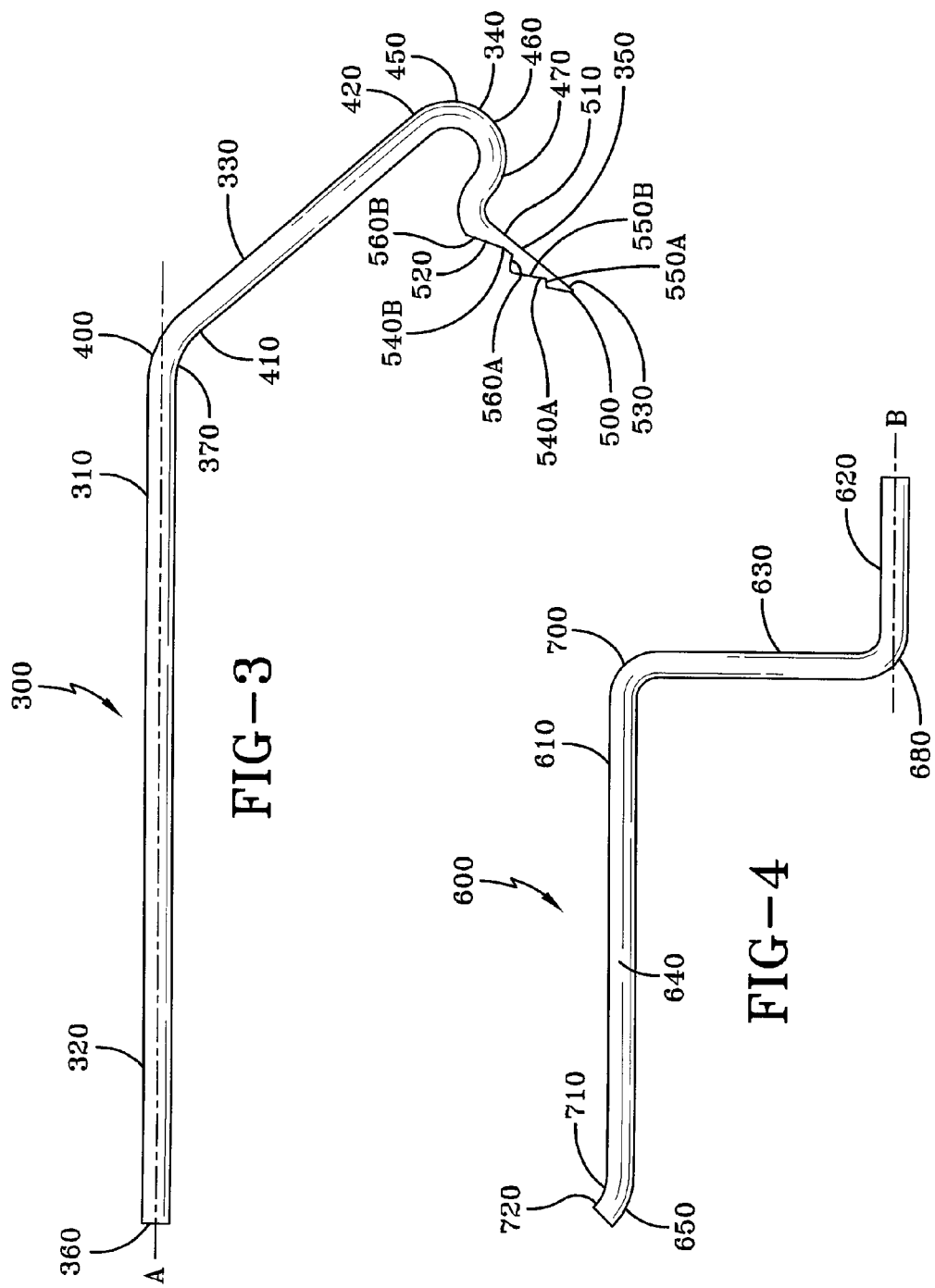

TIRE DEMOUNTING TOOL FOR DEEP-DISH WHEEL RIMS

TECHNICAL FIELD

The present invention generally relates to a tool for demounting a tire from a wheel rim. Particularly, the present invention relates to a demounting tool used to demount a second bead of a tire from a deep-dish wheel rim. More particularly, the present invention relates to a tire demounting tool that allows one individual to demount the second bead of a tire from a deep-dish wheel rim.

BACKGROUND OF THE INVENTION

From time to time, pneumatic tires require repair or replacement, and as such, the tire must be removed from a wheel rim to which the tire is mounted. To remove the tire, a variety of tools have been developed, which generally include an elongated bar having a handle and a working end that is adapted to be inserted between a bead of the tire and the wheel rim. The working end of the tool typically has a flattened or tapered portion to facilitate the manual insertion of the working end between the tire bead and the wheel rim. As such, once the working end of the tire removal tool is manually inserted between the bead of the tire and the wheel rim, the user applies pressure on the handle and moves a portion of the working end of the tire removal tool into contact with the wheel rim. As a result, the wheel rim is established as a fulcrum, while the tire removal tool serves as a lever. The pressure applied upon the handle of the tire removal tool causes the working end to move a segment of the tire bead inward, allowing the tire bead to be stretched over the wheel rim by moving the tool around the periphery of the tire. To facilitate this process, automated machines have been developed, which rotate the tire in conjunction with the use of the tire removal tool, and as a result, there is no need for manually moving the tire removal tool around the periphery of the tire.

Furthermore, many tires require specialized tools for their removal, whereby a separate tool is used to release or demount each of the first and second tire beads from the wheel rim. For example, after the first tire bead is released from the wheel rim, a specialized tire removal tool is then inserted between the second tire bead and the wheel rim, so as to leverage the second bead over the wheel rim to complete the removal of the tire from the wheel rim.

Known working tool designs for demounting a second tire bead from a wheel rim include a straight tool, which has a tip that angles downwardly from the longitudinal plane of the tool. While a downward end creates a more efficient lever, the downwardly turned tip, however, makes insertion difficult and therefore, requires that the tip be inserted at a sideways angle to the second bead. As such, a user typically inserts the tip between the second tire bead and the wheel rim, leading with a corner of the tip, while gradually working the remainder of the tip underneath. However, the range of motion of such straight tool is limited by contact with the tread of the tire. Thus, because the tread of the tire is relatively stiff and does not compress when the tool is raised to the point of contacting the tread, the rotation of the straight tool is effectively stopped. This may prevent the user of the tool from successfully demounting the tire, or, in the least require the user of the tool to apply greater effort to pry the wheel rim free.

Moreover, the use of such current tire removal or demounting tools to demount the second tire bead from standard-size wheel rims discussed above, are generally tedious and cumbersome to use when removing the stiffer second bead from the lighter, smaller-size wheel rims, such as a deep-dish wheel rim. As a result, the use of such current tire demounting tools to remove a tire from a deep-dish wheel rim may lead to damage to the wheel rim and/or injury to the individual demounting the tire.

A deep-dish wheel rim 10, as shown in FIG. 1, has a cylindrical body or barrel 20 that includes an annular inner surface 22 and an annular outer surface 24. A mounting hub 30 is attached within the annular inner surface 22 of the wheel rim 10, and is used for mounting the wheel rim 10 to a rotating spindle or other rotating axle structure provided by a car, truck, or other vehicle via mounting apertures 32. The barrel 20 is bounded laterally by an annular inboard flange 40 and an annular outboard flange 42, and as such, the sides of the wheel rim 10 proximate to the respective inboard and outboard flanges 40 and 42 are respectively referred to as a hub side 50 and a dish side 52. As such, the term "deep-dish" refers to the portion of the inner surface 22 of the barrel 20 of the wheel rim 10 that separates the outboard flange 42 from the mounting hub 30 by a portion of the inner surface 22 of the barrel 20, whereby such dish portion is designated by reference character "D" in FIG. 2. Thus, when the deep-dish wheel rim 10 is mounted to a vehicle via the mounting hub 30, the inboard flange 40 is proximate to the vehicle, while the outboard flange 42 is distal to the vehicle. As a result, a large portion of the inner surface of the barrel 22, or dish D, is left exposed to the environment when the wheel rim 10 is mounted to the vehicle.

The deep-dish wheel rim 10 also includes an annular drop center section 60 that is recessed into the barrel 20, as shown in FIG. 2. That is, the annular drop center section 60 is configured so that it has a radius R relative to the axial center "X" of the wheel rim 10 that is smaller than a radius R' of the remaining adjacent portions of the annular barrel 20. Furthermore, the annular drop center section 60 is positioned in the wheel rim 10, such that it is proximate, or nearer, to the dish side 52 of the wheel rim 10 than it is to the hub side 50 of the wheel rim 10.

Deep-dish wheel rims 10, also referred to as low-box wheel rims, typically have a lightweight design and may be of any suitable diameter, such as 17.5" for example. Such low-profile design makes deep-dish wheel rims 10 desirable in trucking or hauling applications where the trailer platform supported by such wheel rims can be positioned at its lowest level to maximize the cargo carrying height that the trailer may have, while still allowing the trailer to meet maximum height regulations for travel on public roadways.

Finally, to mount a tire 100 to the deep-dish wheel rim 10, the wheel rim 10 is inserted within a mounting aperture 110 of the tire 100. As such, the barrel 20 of the wheel rim 10 forms an airtight seal with a first bead 120 and a second bead 130 of the tire 100 that circumscribes the mounting aperture 110 of the tire 100. As such, the first bead 120 forms an airtight seal with the outboard flange 42 of the wheel rim 10, and the second bead 130 forms an airtight seal with the inboard flange 40 of the wheel rim 10. Thus, the first bead 120 of tire 100 is positioned proximate to the dish side 52 of the wheel rim 10 and the second bead 130 of the tire 100 is positioned proximate to the hub side 50 of the wheel rim 10. It should also be appreciated that the first and second beads 120 and 130 of the tire 100 are proximate to respective tire sidewalls 132 and 134 that are separated by a tread surface 136 that extends therebetween. As such, the sidewall 132 is positioned adjacent to the dish side 52 of the wheel rim 10 and the sidewall 134 is positioned adjacent to the hub side 50 of the wheel rim 10.

Therefore, while generally available tire demounting tools can be used to accomplish the removal of the first bead 120 of the tire 100 from the dish side 52 of the wheel rim 10, current tire demounting tools are not efficient in removing the second bead 130 of the tire 100 from the deep-dish wheel rim 10. In fact, techniques for using current tire demounting tools for removing the second bead 130 of the tire 100 from the deep-dish wheel rim 10 requires substantial physical exertion given the wide portion of the tire that is mounted across the barrel 20 of the deep-dish wheel rim 10. This can lead to physical injury, as well as damage to the deep-dish wheel rim 10 and to the tire 100 as well. Moreover, many deep-dish wheel rims 10 are extremely lightweight, and therefore require substantial anchoring to a floor or other surface in order to allow the tire removal forces applied through the demounting tool to be effectively isolated and delivered to the tire 100 to remove the second bead 130 of the tire 100 from the deep-dish wheel rim 10. As such, the removal of the tire 100 from the deep-dish wheel rim 10 using currently available demounting tools generally requires at least two trained individuals, whereby one individual stabilizes the wheel rim 10 at one point or side, while another individual utilizes the tire demounting tool from a diametrically opposed point or side of the wheel rim 10 to remove the tire 100. Therefore, the process of removing a tire 100 from the deep-dish wheel rim 10 using current demounting tools is physically demanding and dangerous and often requires two trained individuals to execute, necessitating additional staffing costs and training, which is undesirable.

Therefore, there is a need for a tire demounting tool that allows one individual to demount a second bead of a tire from a deep-dish wheel rim. In addition, there is a need for a tire demounting tool for demounting a second bead of a tire from a deep-dish wheel rim that is easy to use. Furthermore, there is a need for a tire demounting tool that is configured to allow one individual to anchor the wheel rim and tire to a surface using his or her body weight while applying a pushing force moving away from the individual to the tire demounting tool to demount the second bead of the tire from a deep-dish wheel rim.

SUMMARY OF THE INVENTION

In light of the foregoing, it is a first aspect of the present invention to provide a tire demounting tool for demounting a second bead of a tire from a deep-dish wheel rim having a flange. The tire demounting tool includes an elongated handle extending to define a longitudinal axis. An extension section is attached to the handle at a bend, such that the extension section extends away from the longitudinal axis at an oblique angle. A curved pivot section is attached to the extension section, such that the curved pivot section partially extends away from the longitudinal axis and partially extends toward the longitudinal axis. A wedge is attached to the curved pivot section, the wedge extending away from the longitudinal axis. The wedge also includes a tip that is configured to be inserted in a gap between the second bead of the tire and the deep-dish wheel rim, such that the flange of the deep-dish wheel rim is received in at least one notch provided by the wedge, and the elongated handle extends over at least a portion of the deep-dish wheel rim so as to be proximate to a portion of the tire substantially opposite the gap.

In another aspect, the present invention provides that the at least one notch includes a plurality of notches, whereby one the notch is larger than another one of the notches.

In another embodiment, the present invention provides that at least one notch has a triangular profile.

Still another embodiment of the present invention provides that the wedge has a flat surface and a substantially opposed gripping surface, such that the gripping surface includes the at least one notch.

In another aspect, the present invention provides that the wedge has a longitudinal axis, and wherein the at least one notch includes a first wall and a second wall wherein the first wall is oriented at a steeper angle than the second wall relative to the longitudinal axis of the wedge.

It is another aspect of the present invention to provide an insertion tool to enable a demounting tool to be used for demounting a second bead of a tire from a deep-dish wheel rim having a flange. The insertion tool includes a handle that extends to define a longitudinal axis. An offset section extends from the handle at a first bend, such that the offset section extends from the longitudinal axis at a substantially right angle. A pry section extends from the offset section at a second bend, such that the pry section is substantially parallel to the longitudinal axis. A curved tip section extends from the offset section, such that the tip section extends away from the longitudinal axis at a substantially oblique angle and forms a concave surface distal to the handle. The curved tip is configured to be inserted in a gap between the second bead of the tire and the deep-dish wheel rim, such that the concave surface is adjacent to the flange, so as to increase the size of the gap to enable the demounting tool to be inserted therein to demount the second bead of the tire from the deep-dish wheel rim.

It is yet another aspect of the present invention to provide a kit for demounting a second bead of a tire from a deep-dish wheel rim having a flange after a first bead of the tire has been demounted. The kit includes an insertion tool that has a handle that extends to define a longitudinal axis. An offset section extends from the handle at a first bend, such that the offset section extends from the longitudinal axis at a substantially right angle. A pry section extends from the offset section at a second bend, such that the pry section is substantially parallel to the longitudinal axis. A curved tip section extends from the offset section, such that the tip section extends away from the longitudinal axis at a substantially oblique angle and forms a concave surface distal to the handle. The curved tip is configured to be inserted in a gap between the second bead of the tire and the deep-dish wheel rim, such that the concave surface is adjacent to the flange and the offset section is proximate to the deep-dish wheel rim, whereupon the insertion tool is rotated so that the offset section is distal to the deep-dish wheel rim to increase the size of the gap to form an enhanced gap. The kit also includes a tire demounting tool that includes an elongated handle that extends to define a longitudinal axis. An extension section is attached to the handle at a bend, such that the extension section extends away from the longitudinal axis at an oblique angle. A curved pivot section is attached to the extension section, the curved pivot section partially extends away from the longitudinal axis and partially extends toward the longitudinal axis. A wedge is attached to the curved pivot section, such that the wedge extends away from the longitudinal axis. The wedge includes a tip that is configured to be inserted in the enhanced gap created by the insertion tool, such that the flange of the deep-dish wheel rim is received in at least one notch provided by the wedge. The handle of the demounting tool extends over at least a portion of the deep-dish wheel rim so as to be proximate to a portion of the tire substantially opposite to the gap, such that the curved pivot pivots upon a side wall of the tire as the handle is moved away from the tire, so as to lift the wedge and the deep-dish wheel rim, thereby demounting the second tire bead from the deep-dish wheel rim.

It is still another aspect of the present invention to provide a method of demounting a second bead of a tire from a deep-dish wheel rim having a flange after a first bead of the tire has been demounted having a flange. The method includes providing a gap between the second bead of the tire and the flange of the deep-dish wheel rim. Providing a tire demounting tool having a handle that extends along a longitudinal axis, an extension section extending from the handle at an oblique angle to the longitudinal axis, a curved pivot section attached to the extension section, and a wedge attached to the curved pivot section, the wedge having at least one notch. Inserting the wedge within the gap so that the flange of the deep-dish wheel rim rests in the at least one notch of the wedge, whereby the handle extends over at least a portion of the deep-dish wheel rim so as to be proximate to a portion of the tire substantially opposite to the gap. Moving the handle of the tire demounting tool away from the tire. Pivoting the curved pivot section of the tire demounting tool on a sidewall of the tire adjacent to the gap, whereby the wedge lifts the deep-dish wheel rim to demount the second bead of the tire therefrom.

In another aspect, the present invention provides that the step of providing the gap is performed by inserting an insertion tool between the tire and the deep-dish wheel rim.

In yet another embodiment, the present invention provides that the insertion tool includes a handle that extends to define a longitudinal axis. An offset section extends from the handle at a first bend, such that the offset section extends from the longitudinal axis at a substantially right angle. A pry section extends from the offset section at a second bend, such that the pry section is substantially parallel to the longitudinal axis. A curved tip section extends from the offset section, such that the tip section extends away from the longitudinal axis at a substantially oblique angle and forms a concave surface distal to the handle.

Still another aspect of the present invention includes applying a weight to a side of the tire substantially opposite the gap.

BRIEF DESCRIPTION OF THE DRAWINGS

FIG. 3 is an elevational view of the tire demounting tool in accordance with the concepts of the present invention;

FIG. 4 is an elevational view of an insertion tool in accordance with the concepts of the present invention;

DETAILED DESCRIPTION OF THE INVENTION

Figure 1:
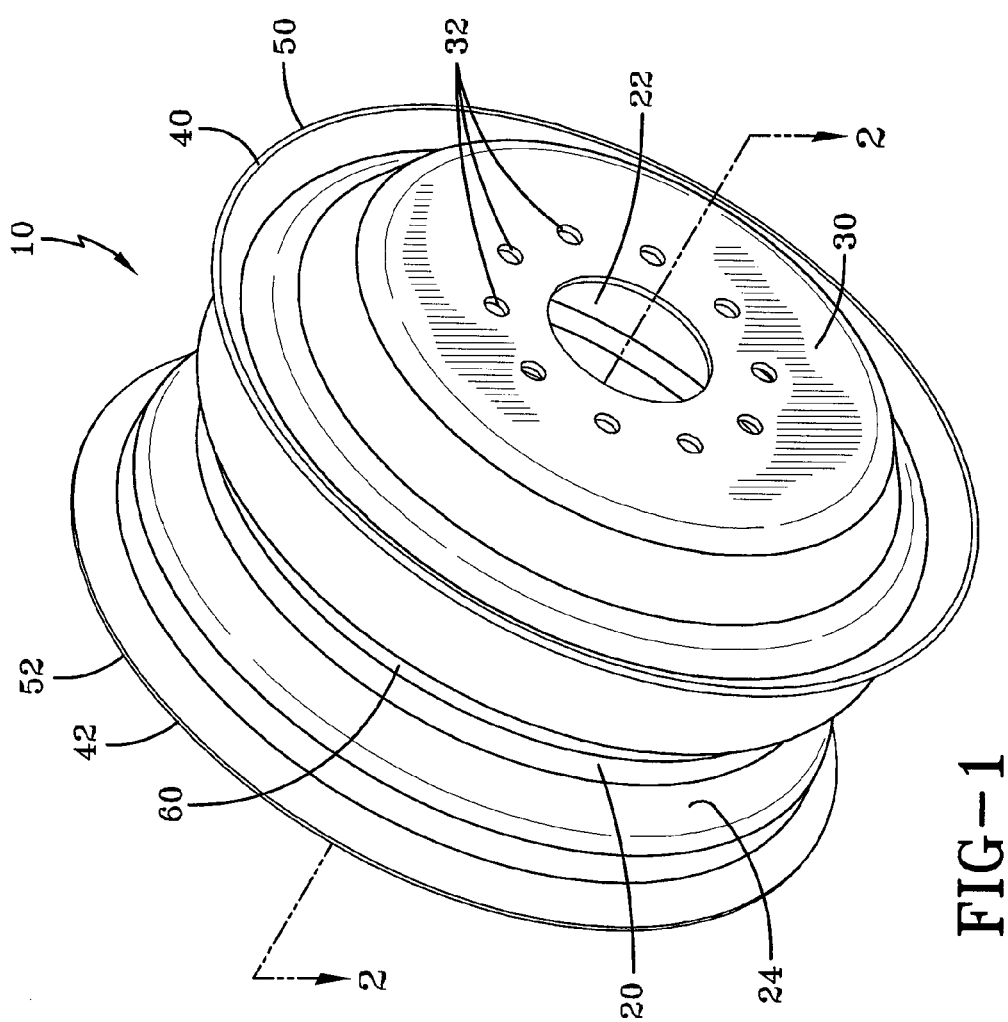
FIG. 1 is a perspective view of a deep-dish wheel rim for use with a tire demounting tool to remove a second bead of a tire therefrom in accordance with the concepts of the present invention.
Figure 2:
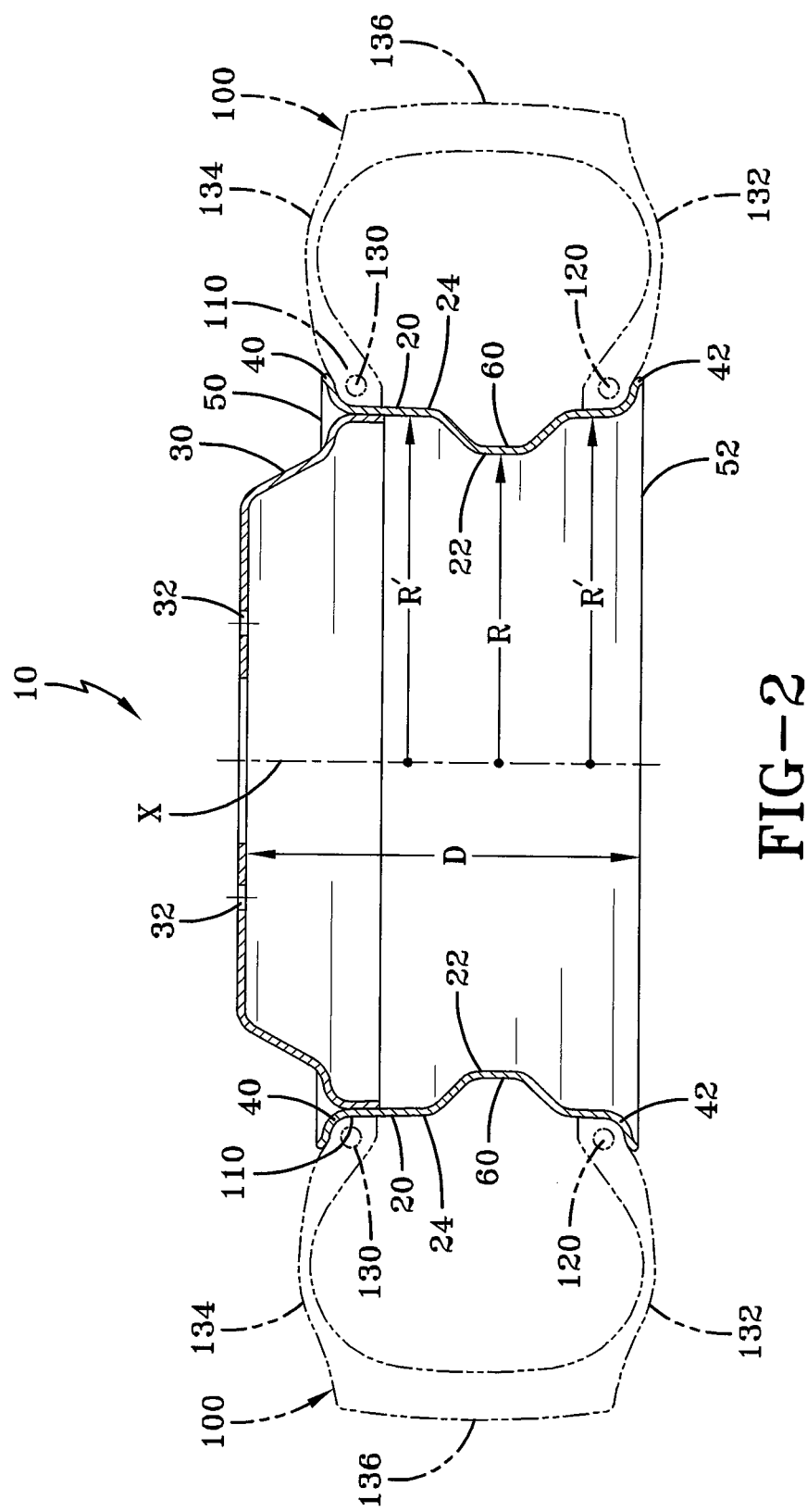
FIG. 2 is a cross-sectional view of the deep-dish wheel rim shown in FIG. 1 and a tire mounted thereto.

A tire demounting tool of the present invention is generally referred to by reference numeral 300, as shown in FIG. 3 of the drawings. It should be appreciated that the tire demounting tool 300 is utilized for demounting the second bead 130 of the tire 100 from the deep-dish wheel rim 10, and as such, a separate tool is used to initially demount the first bead 120 of the tire 100 from the deep-dish wheel rim 10.

The tire demounting tool 300 generally includes a body 310 that is formed of a single section of material, such as steel, aluminum or the like. The body 310 includes a plurality of unified sections, which includes a handle 320, an extension section 330 extending from the handle 320, a pivot section 340 extending from the extension section 330, and a wedge 350 extending from the pivot 340. It should also be appreciated that the body 310, including any of the sections 320-350, may have any suitable cross-sectional shape, including a rectilinear shape, a curvilinear shape, or a combination of both. For example, the body 310, except for the wedge 350, may be formed to have a cylindrical cross-section, as shown in in the Figs.

The handle 320 of the tire demounting tool 300 is elongated and extends in a linear manner between ends 360 and 370, so as to define a longitudinal axis, denoted by reference character "A". It should be appreciated that the handle 320 may include variations from the linear shape shown in the drawings. For example, handle 320 may include an offset section or other deviation from the axis A. The length of handle 320 may vary in accordance with the amount of leverage needed to remove the second bead 130 of the tire 100 from the wheel rim 10. If necessary, extensions may be added to provide additional leverage.

The extension section 330 extends axially from the end 370 of the handle 320 at a bend 400, which causes the extension section 330 to extend radially away from the longitudinal axis A. As such, the extension section 330 extends from the axis A at a substantially oblique angle. The extension section 330 is substantially linear in shape and is terminated at ends 410 and 420. In one aspect, it should be appreciated that the extension section 330 is shorter in length than the length of the handle 320 to facilitate the leverage imparted to the tire 100 during the use of the demounting tool 300 in the manner to be discussed.

Extending from the end 420 of the extension section 330 is the curved pivot section 340. Specifically, the pivot 340 extends radially outward, or away from the longitudinal axis A, as it extends axially from the extension section 330 to form a neck portion 450 near the end 470 of the extension section 330. As the pivot 340 continues to extend axially from the extension section 330, the pivot 340 reaches a radial outward extremity or convex apex 460, whereupon the pivot 340 extends axially outward and radially inward, or toward the longitudinal axis A, to form a forward portion 470 that extends toward the wedge 350 and that extends back toward the handle 320. In other words, the curved pivot 340 that is attached to the extension section 330 forms a curved surface that comprises the neck portion 450, apex 460, and the forward portion 470. In one aspect, the pivot 340 comprises a substantially semi-circular shape.

The wedge 350 extends generally axially outward from the forward section 470 of the pivot 340 while extending radially outward or away from the longitudinal axis A, back toward the handle 320 to a tip 500. As shown in FIG. 3, the wedge 350 has a generally flat top surface 510 that is opposite a gripping surface 520, such that the gripping surface 520 is proximate to the handle 320. Also, to facilitate insertion of the wedge 350, the tip 500 may taper to form a thin edge 530 at the axial outer extremity of the tool 300 adjacent to the tip 500. As shown, the taper may be applied only to a lower surface of the tip 500. The gripping surface 520 includes various notches 540A-B that are formed axially inward of the tip 500. That is, the notches 540A-B of the gripping surface 520 are proximate the handle 320, while the flat top surface 510 is distal to the handle 320. The notches 540A-B are configured to receive the inboard flange 40 of the deep-dish wheel rim 10 therein to stabilize the demounting tool 300 and serve to allow force applied by a user to the handle 320 to be transferred to the inboard flange 40 during the removal of the second bead 130 in a manner to be discussed. In particular, the second notch 540B is provided axially inward of the first notch 540A. In addition, the notches 540A and 540B are formed by respective first and second walls 550A-B and 560A-B that define generally triangular notches. As shown in FIG. 3, the walls 550A and 560A of each respective notch 540A and 540B may be oriented substantially perpendicular to the walls 550B and 560B. In addition, the first walls 550A,560A may be shorter than walls 550B,560B and oriented so as to be substantially parallel to axis A, while the walls 550B,560B are substantially orthogonal to axis A to facilitate insertion of the wedge 350 and to resist forces that would force the tool 300 outward after its insertion.

The wedge 350 may extend outward from the pivot 340 at any angle including horizontal. In the example shown, the wedge 350 extends from the pivot 340 at a substantially oblique angle relative to axis A. In other words, the wedge 350 extends radially outward from the axis A as it extends axially outward from pivot 340 toward the handle 320.

To facilitate the use of the tire demounting tool 300, an insertion tool 600 is also used, as shown in FIG. 4 of the drawings. That is, the insertion tool 600 is used prior to the use of the tire demounting tool 300 in a manner to be discussed. Specifically, the insertion tool 600 generally includes a body 610 formed of a single section of material, such as steel, aluminum or the like. The body 610 includes a plurality of unified sections, which includes a handle 620, an offset section 630 that extends from the handle 620, a pry section 640 that extends from the offset section 630, and a tip section 650 that extends from the pry section 640. The body 610 of the insertion tool 600, including the sections 620-650, may have any suitable cross-sectional shape, including a rectilinear shape, a curvilinear shape, or a combination of both. For example, the body 610 of the insertion tool 600 may be formed to have a cylindrical cross-section, as shown in in the Figs.

The handle 620 of the insertion tool 600 is elongated and extends in a linear manner, so as to define a longitudinal axis, denoted by reference character "B". The offset section 630 extends axially outward from the handle 620 and radially outward from the longitudinal axis B at a bend 680. As such, the offset section 630 is substantially perpendicular to the handle 620. It should also be appreciated that the offset section 630 is dimensioned so as to be slightly larger than the width dimension of the tread 136 of the tip 100. The pry section 640 extends axially outward from the offset section 630 at a bend 700, such that the pry section 640 is substantially parallel to the axis B. It should be appreciated that the pry section 640 is typically longer in length than the length of either of the offset section 630 or the handle 620, but is not necessary. Extending axially outward from an end of the pry section 640 and radially outward from the axis B is the curved tip 650. The curved tip 650 includes an axially outwardly extending curved concave pivot section surface 710 from which an axially outwardly extending, and radially outwardly extending retention section 720 is provided. It should be appreciated that the retention section 720 is configured so that it extends at an oblique angle relative to the axis B, and is substantially linear in shape. In addition, the curved concave pivot section 710 is positioned so that it is distal to the handle. The curved tip 650 is shown with the same cylindrical cross-sectional shape as the other sections 620-650 of the insertion tool 600; however, the curved tip 650 may take on any other suitable cross-sectional shape.

Figure 5:
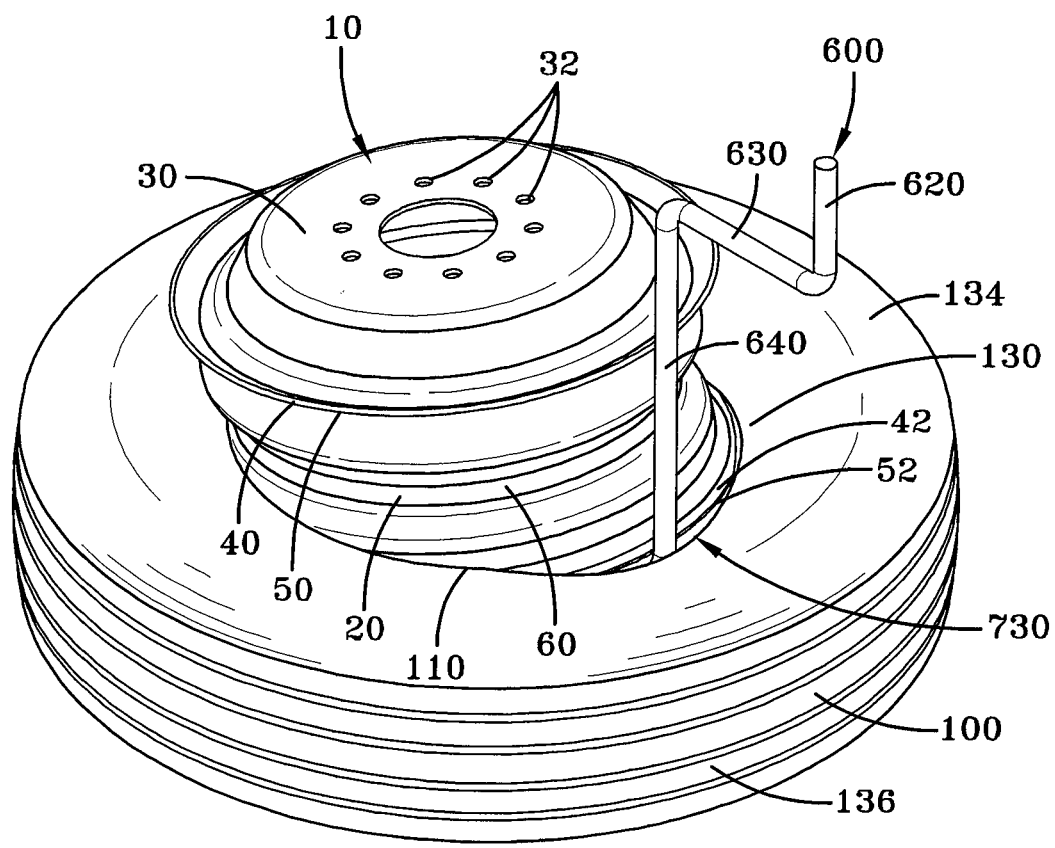
FIG. 5 is a perspective view of the insertion tool that has been inserted between a second bead of the tire and the deep dish wheel rim in accordance with the concepts of the present invention.
Figure 6A:
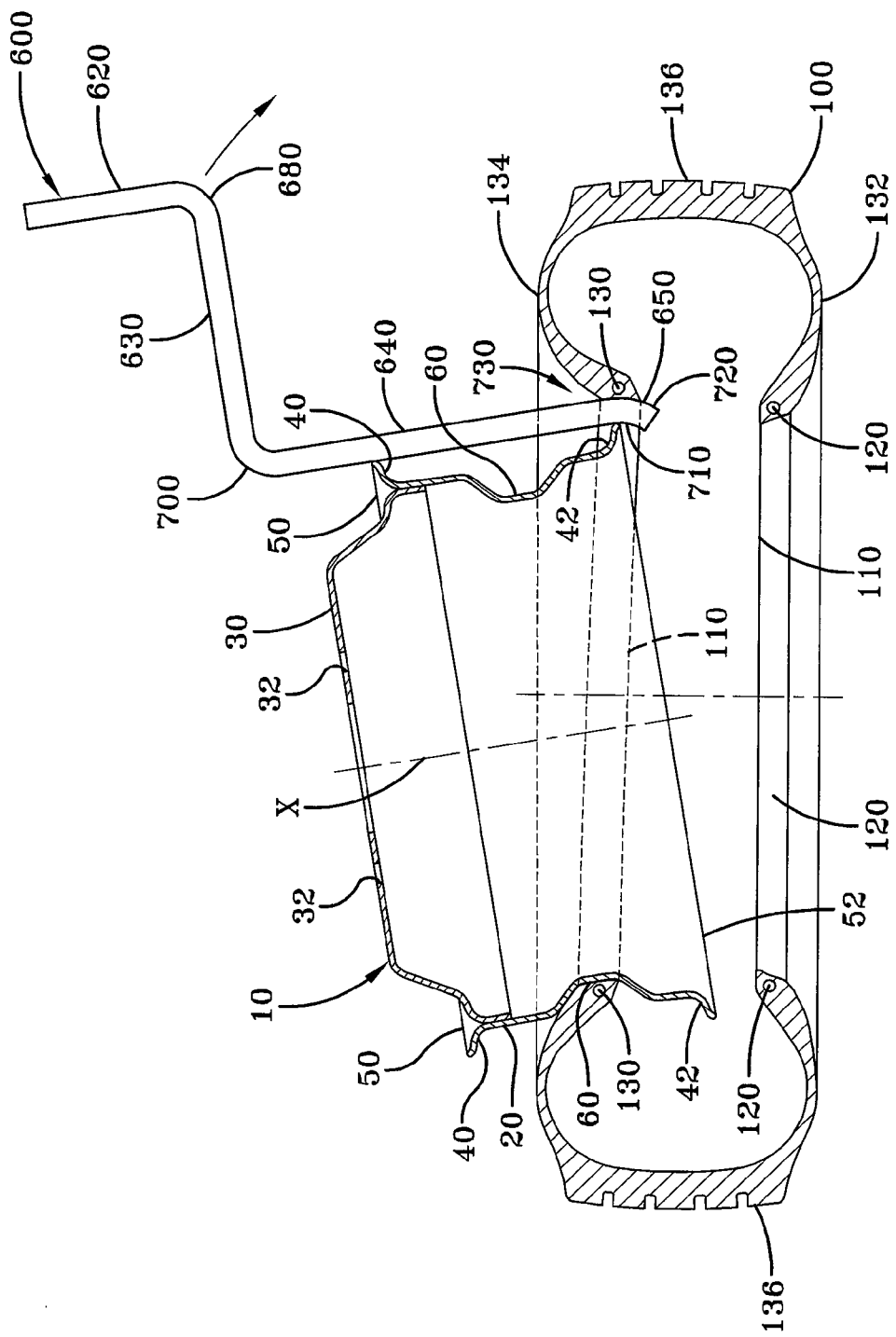
FIG. 6A is a cross-sectional view showing the insertion tool inserted between the second bead of the tire and the wheel rim, whereby the insertion tool is inserted within an initial gap and is at an initial position, in accordance with the concepts of the present invention.
Figure 6B:
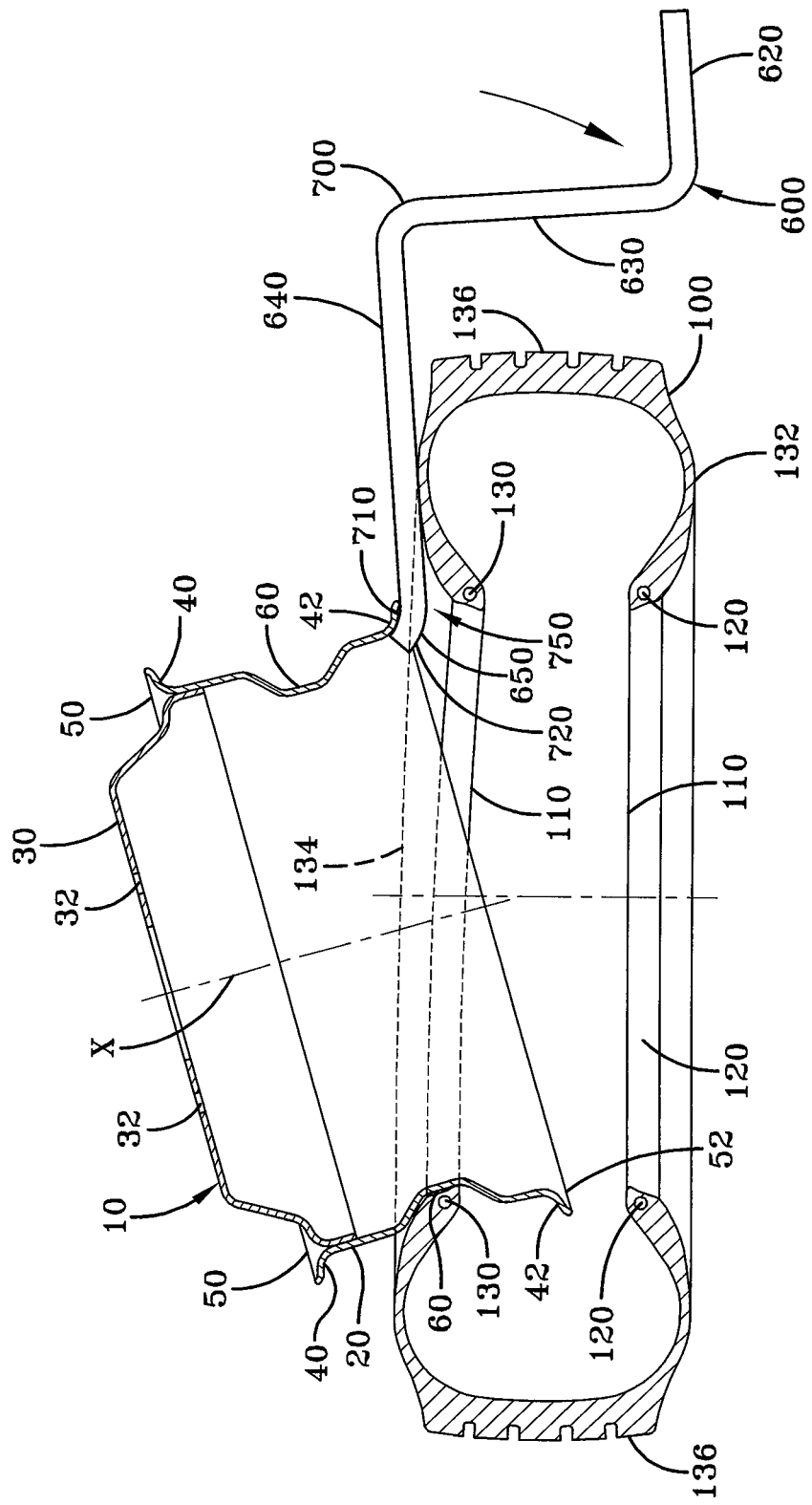
FIG. 6B is a cross-sectional view showing the insertion tool inserted between the second bead of the tire and the wheel rim, whereby the insertion tool is rotated to a final position in order to form an enhanced gap suitable for receiving the tire demounting tool therein in accordance with the concepts of the present invention.

Thus, with the structural features of the tire demounting tool 300 and the insertion tool 600 set forth, the following discussion will present the steps for placing the tools 300, 600 into use to demount the second bead 130 of the tire 100 from the deep-dish wheel rim 10. It should be appreciated that once the first bead 120 of the tire 100 has been demounted, a portion of the second bead 130 of the tire 100 is able to be positioned within the drop center 60 of the wheel rim 10, as shown in FIGS. 5 and 6A-B. As a result, because the diameter of the mounting aperture 110 of the tire 100 is larger than the diameter of the drop center 60, a gap 730 is initially formed between the second bead 130 and the outboard flange 42 of the wheel rim 10. As such, the tip 650 of the insertion tool 600 is positioned within the gap 730 between the second bead 130 of the tire 100 and the outboard flange 42 of the dish side 52 of the wheel rim 10, such that the concave pivot section 710 is positioned adjacent to the outboard flange 42 of the deep-dish wheel rim 10, thereby allowing the retention section 720 to extend toward the axial center X of the wheel rim 10 so that it is proximate to its inner surface 22 of the wheel rim 10. In addition, the pry section 640 is positioned so that it is substantially adjacent to the inboard and outboard flanges 40,42 of the wheel rim 10, as shown in FIG. 6A. Next, as shown in FIG. 6B, the concave pivot section 710 of the insertion tool 600 is pivoted upon the outboard flange 42 of the wheel rim 10 so that the pry section 640 of the insertion tool 600 is moved so that it is proximate to the sidewall 134 of the tire 100, whereupon the handle 620 is brought to rest upon or near a support surface, such as a floor, upon which the tire 100 is resting. As a result, the insertion tool 600 enlarges the gap 730 to form an enhanced gap 750 between the second bead 130 of the tire 100 and the outboard flange 42 of the dish side 52 of the wheel rim 10. The enhanced gap 750 is of a suitable dimension to more readily accommodate the wedge 350 of the demounting tool 300 to be inserted within the gap 750. Thus, it should be appreciated that while the insertion tool 600 facilitates the use of the demounting tool 300, the use of the insertion tool 600 is not required in order to use the demounting tool 300.

Figure 7:
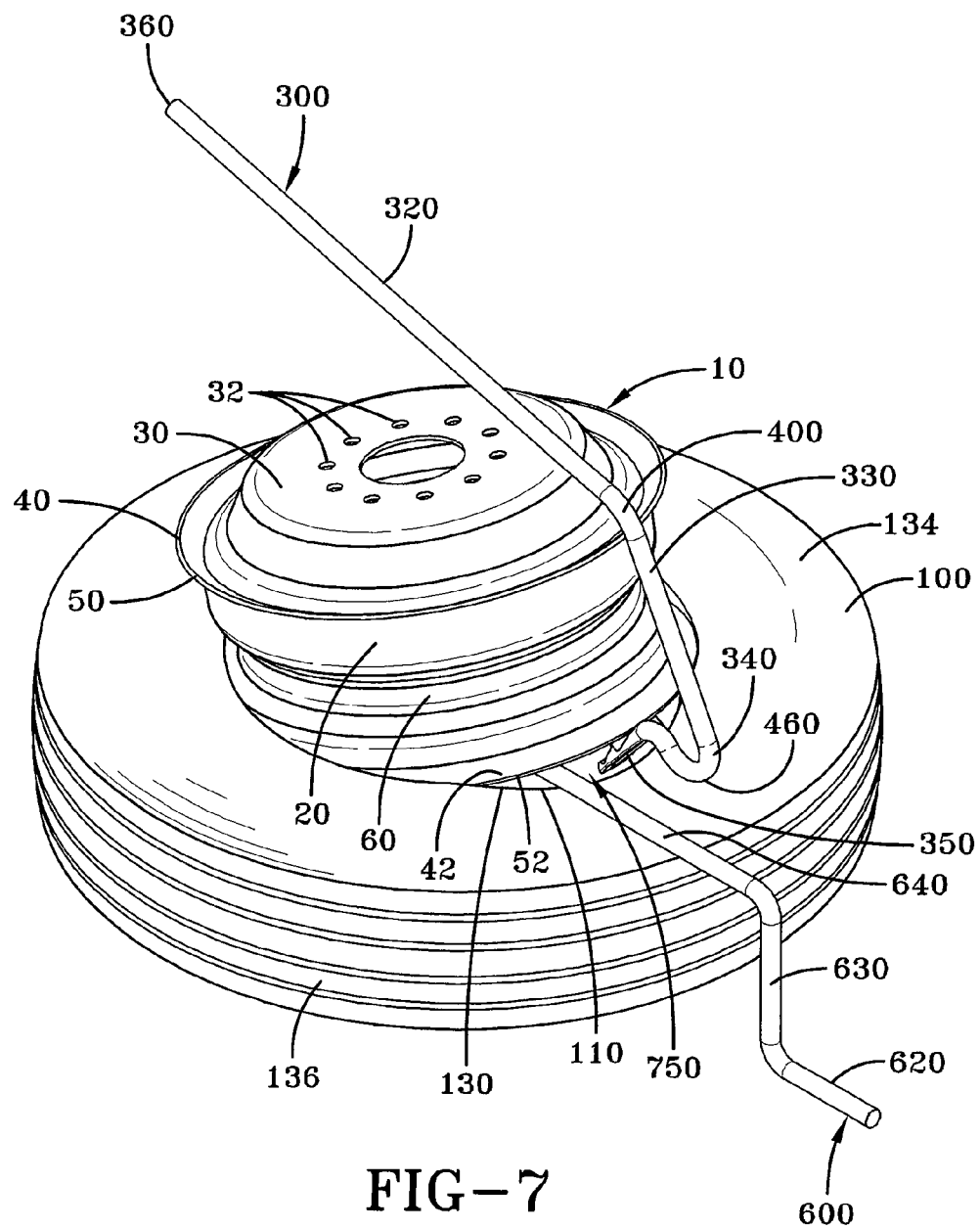
FIG. 7 is a perspective view of the tire demounting tool and the insertion tool, each inserted within the enhanced gap formed between the second bead of the tire and the wheel rim in accordance with the concepts of the present invention.
Figure 8A:
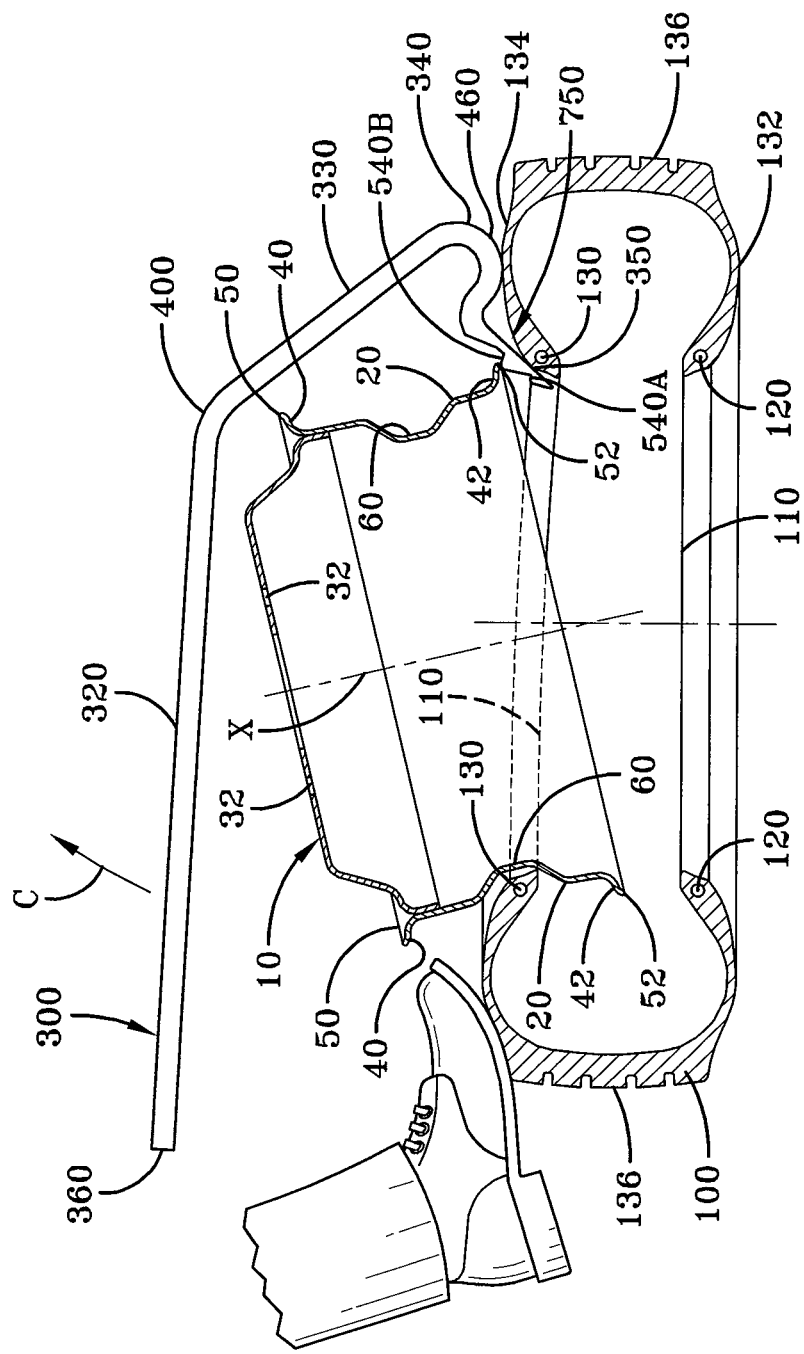
FIG. 8A is a cross-sectional view showing the insertion tool removed, and the demounting tool inserted in the enhanced gap between the second bead of the tire and the wheel rim, whereby the demounting tool is at an initial position in accordance with the concepts of the present invention.
Figure 8B:
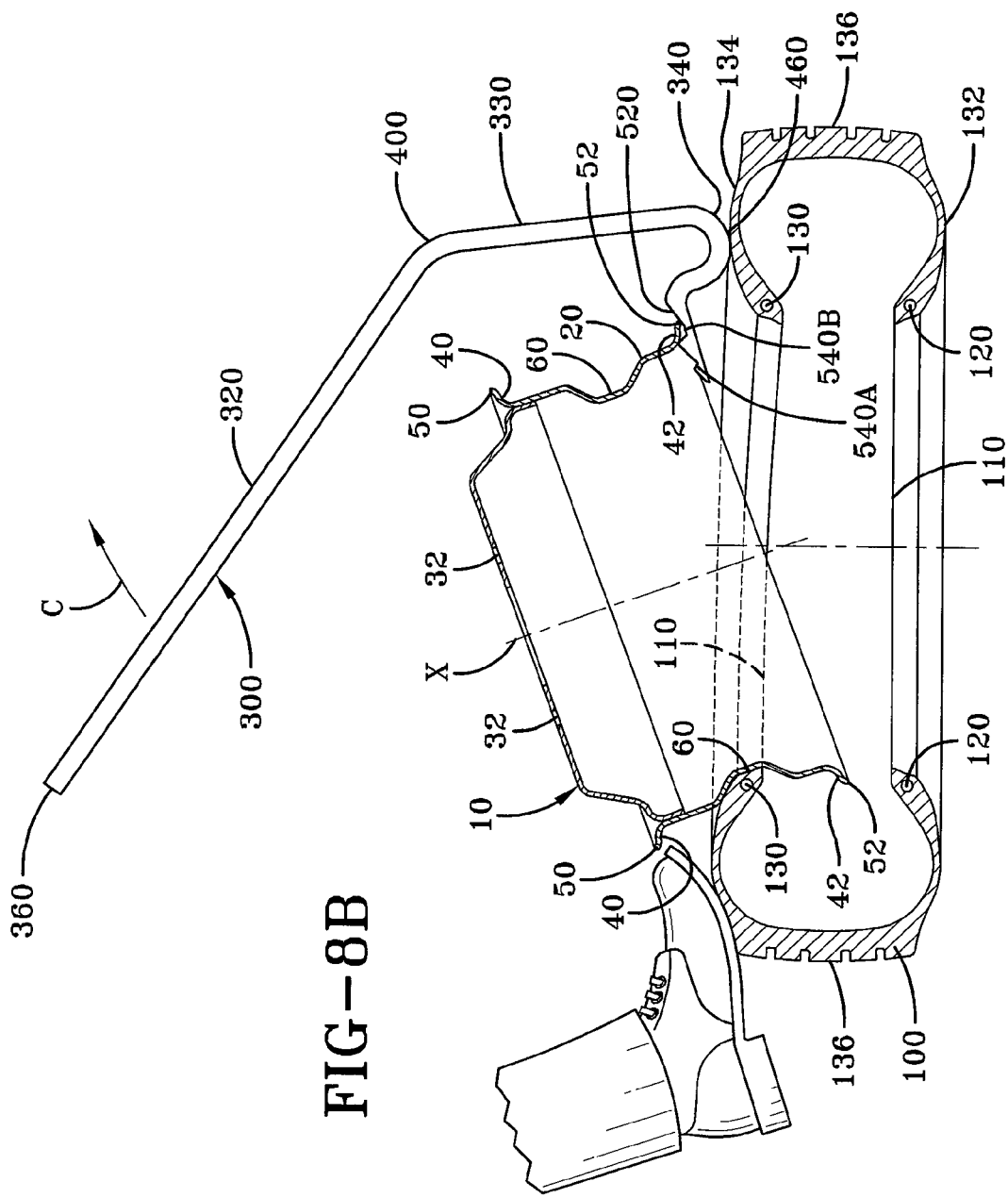
FIG. 8B is a cross-sectional view showing the insertion tool removed, and the demounting tool inserted in the enhanced gap between the second bead of the tire and the wheel rim, whereby the demounting tool is rotated toward a final position, such that the second bead of the tire is demounted from the wheel rim.

Next, as shown in FIGS. 7 and 8A-B, the wedge 350 of the demounting tool 300 is then inserted within the enhanced gap 750, such that the convex apex 460 of the pivot 340 is positioned adjacent to and resting upon the sidewall 134 of the tire 100 that is proximate to the second bead 130. It should be appreciated that depending on the size of the enhanced gap 750, the tapered wedge 350 is maneuvered so that the outboard flange 42 rests in one of the notches 540A-B. With the wedge 350 inserted within the enhanced gap 750, the handle portion 320 of the demounting tool 300 extends back across at least a portion of the hub side 50 of the wheel rim 10, as shown in FIG. 8A. That is, the demounting tool 300 is inserted within the enhanced gap 750, such that the wedge 350 and the end 360 of the handle 320 are respectively proximate to diametrically-opposed points on the wheel rim 10. Next, the individual using the demounting tool 300 places his or her body weight, such as by application of his or her foot, on the portion of the sidewall 134 of the tire 100 that is proximate to the end 360 of the handle 320 to counterbalance a lifting/pushing force applied to the handle 330, which is applied by the user in a direction moving away from the wheel rim 10, denoted by the arrow "C". This application of force causes the demounting tool 300 to pivot upon the convex apex 460 of the pivot 350, causing the wedge 350 to move or rotate upward. That is, the upward movement of the wedge 350 lifts the wheel rim 10 upward, while also forcing the sidewall 134 and the second bead 130 of the tire 100 downward toward the surface supporting the tire 100, and as a result, the second bead 130 of the tire 100 is demounted from the outboard flange 42 of the wheel rim 10, as shown in FIG. 8B. Once this process is completed, the second bead 130 of the tire 100 is removed from the wheel rim 10, thus completing the process of demounting the tire 100 from the wheel rim 10. Thus, the demounting tool 300 serves to operate as a lever and the sidewall 134 of the tire 100 serves to operate as a fulcrum, allowing the wedge 350 to be rotated to allow the second bead 130 of the tire 100 to be demounted from the deep-dish wheel rim 10.

Therefore, one advantage of the present invention is that a tire demounting tool allows one individual to easily demount the second bead of a tire from a deep-dish wheel rim. Another advantage of the present invention is that the tire demounting tool is lightweight and easy to use. Still another advantage of the present invention is that an insertion tool is used to facilitate the use of the tire demounting tool.

It should be apparent that the invention as described above satisfies the stated object, among others. It should further be understood that the preceding is merely a detailed description of a preferred embodiment of this invention and that various modifications and equivalents can be made without departing from the spirit or scope of the invention. The preceding description, therefore, is not meant to limit the scope of the invention. Rather, the scope of the invention is to be determined by the appended claims and their equivalents.

What is claimed is:

1. A tire demounting tool for demounting a second bead of a tire from a deep-dish wheel rim having a flange, the tire demounting tool comprising:
    an elongated handle extending to define a longitudinal axis;
    an extension section attached to said handle at a bend, such that said extension section extends away from said longitudinal axis at an oblique angle;
    a curved pivot section attached to said extension section, said curved pivot section partially extending away from said longitudinal axis and partially extending toward said longitudinal axis; and
    a wedge attached to said curved pivot section, said wedge extending away from said longitudinal axis;
    wherein said wedge includes a tip that is configured to be inserted in a gap between the second bead of the tire and the deep-dish wheel rim, such that the flange of the deep-dish wheel rim is received in at least one notch provided by said wedge, and said elongated handle extends over at least a portion of the deep-dish wheel rim so as to be proximate to a portion of the tire substantially opposite the gap.

2. The tire demounting tool of claim 1, wherein said at least one notch comprises a plurality of notches, whereby one said notch is larger than another one of said notches.

3. The tire demounting tool of claim 1, wherein said at least one notch has a triangular profile.

4. The tire demounting tool of claim 1, wherein said wedge has a flat surface and a substantially opposed gripping surface, said gripping surface includes said at least one notch.

5. The tire demounting tool of claim 4, wherein said wedge has a longitudinal axis, and wherein said at least one notch includes a first wall and a second wall wherein said first wall is oriented at a steeper angle than said second wall relative to said longitudinal axis of said wedge.

6. An insertion tool to enable a demounting tool to be used for demounting a second bead of a tire from a deep-dish wheel rim having a flange, the insertion tool comprising:
    a handle extending to define a longitudinal axis;
    an offset section extending from said handle at a first bend, such that said offset section extends from said longitudinal axis at a substantially right angle;
    a pry section extending from said offset section at a second bend, such that said pry section is substantially parallel to said longitudinal axis; and
    a curved tip section extending from said offset section, such that said tip section extends away from said longitudinal axis at a substantially oblique angle and forms a concave surface distal to said handle;
    wherein said curved tip is configured to be inserted in a gap between the second bead of the tire and the deep-dish wheel rim, such that said concave surface is adjacent to the flange, so as to increase the size of the gap to enable the demounting tool to be inserted therein to demount the second bead of the tire from the deep-dish wheel rim.

7. A kit for demounting a second bead of a tire from a deep-dish wheel rim having a flange after a first bead of the tire has been demounted, the kit comprising:
    an insertion tool comprising:
        a handle extending to define a longitudinal axis;
        an offset section extending from said handle at a first bend, such that said offset section extends from said longitudinal axis at a substantially right angle;

a pry section extending from said offset section at a second bend, such that said pry section is substantially parallel to said longitudinal axis; and a curved tip section extending from said offset section, such that said tip section extends away from said longitudinal axis at a substantially oblique angle and forms a concave surface distal to said handle;

wherein said curved tip is configured to be inserted in a gap between the second bead of the tire and the deep-dish wheel rim, such that said concave surface is adjacent to the flange and said offset section is proximate to the deep-dish wheel rim, whereupon said insertion tool is rotated so that said offset section is distal to the deep-dish wheel rim to increase the size of the gap to form an enhanced gap; and a tire demounting tool comprising:

an elongated handle extending to define a longitudinal axis;

an extension section attached to said handle at a bend, such that said extension section extends away from said longitudinal axis at an oblique angle;

a curved pivot section attached to said extension section, said curved pivot section partially extending away from said longitudinal axis and partially extending toward said longitudinal axis; and a wedge attached to said curved pivot section, said wedge extending away from said longitudinal axis;

wherein said wedge includes a tip that is configured to be inserted in the enhanced gap created by said insertion tool, such that the flange of the deep-dish wheel rim is received in at least one notch provided by said wedge, whereby said handle of said demounting tool extends over at least a portion of the deep-dish wheel rim so as to be proximate to a portion of the tire substantially opposite to the gap, such that said curved pivot pivots upon a side wall of the tire as said handle is moved away from the tire, so as to lift said wedge and said deep-dish wheel rim, thereby demounting the second tire bead from the deep-dish wheel rim.

8. A method of demounting a second bead of a tire from a deep-dish wheel rim having a flange after a first bead of the tire has been demounted having a flange comprising:

providing a gap between the second bead of the tire and the flange of the deep-dish wheel rim;

providing a tire demounting tool having a handle that extends along a longitudinal axis, an extension section extending from said handle at an oblique angle to said longitudinal axis, a curved pivot section attached to said extension section, and a wedge attached to said curved pivot section, said wedge having at least one notch;

inserting said wedge within said gap so that the flange of the deep-dish wheel rim rests in said at least one notch of said wedge, whereby said handle extends over at least a portion of the deep-dish wheel rim so as to be proximate to a portion of the tire substantially opposite to said gap;

moving said handle of said tire demounting tool away from the tire; and pivoting said curved pivot section of said tire demounting tool on a sidewall of the tire adjacent to said gap, whereby said wedge lifts the deep-dish wheel rim to demount the second bead of the tire therefrom.

9. The method of claim 8, wherein said step of providing said gap is performed by inserting an insertion tool between the tire and the deep-dish wheel rim.

10. The method of claim 9, wherein said insertion tool comprises:

a handle extending to define a longitudinal axis;

an offset section extending from said handle at a first bend, such that said offset section extends from said longitudinal axis at a substantially right angle;

a pry section extending from said offset section at a second bend, such that said pry section is substantially parallel to said longitudinal axis; and a curved tip section extending from said offset section, such that said tip section extends away from said longitudinal axis at a substantially oblique angle and forms a concave surface distal to said handle.

11. The method of claim 9, further comprising:

applying a weight to a side of the tire substantially opposite said gap.

* * * * *